(12) United States Patent
Schmidt

(10) Patent No.: US 11,940,905 B2
(45) Date of Patent: Mar. 26, 2024

(54) SYSTEM AND COMPUTER-IMPLEMENTED METHOD FOR TESTING AN APPLICATION USING AN AUTOMATION BOT

(71) Applicant: UiPath, Inc., New York, NY (US)

(72) Inventor: Kevin Robert Schmidt, Kirkland, WA (US)

(73) Assignee: UiPath, Inc., New York, NY (US)

( * ) Notice: Subject to any disclaimer, the term of this patent is extended or adjusted under 35 U.S.C. 154(b) by 68 days.

(21) Appl. No.: 17/476,297

(22) Filed: Sep. 15, 2021

(65) Prior Publication Data
US 2023/0081622 A1 Mar. 16, 2023

(51) Int. Cl.
  *G06F 11/36* (2006.01)
  *G06F 21/31* (2013.01)

(52) U.S. Cl.
CPC ........ *G06F 11/3692* (2013.01); *G06F 11/368* (2013.01); *G06F 11/3688* (2013.01); *G06F 21/31* (2013.01)

(58) Field of Classification Search
CPC .............. G06F 11/3688; G06F 11/368; G06F 11/3692; G06F 21/31
See application file for complete search history.

(56) References Cited

U.S. PATENT DOCUMENTS

| | | | | |
|---|---|---|---|---|
| 8,185,877 B1* | 5/2012 | Colcord | .................. | G06F 9/44 717/124 |
| 8,732,722 B2 | 5/2014 | Swildens | | |
| 10,536,363 B2 | 1/2020 | Sommer et al. | | |
| 10,963,731 B1* | 3/2021 | Sarkar | .................. | G06V 30/40 |
| 11,514,154 B1* | 11/2022 | Tripathi | .................. | G06F 21/31 |
| 2008/0127097 A1* | 5/2008 | Zhao | .................. | G06F 11/3684 717/124 |
| 2014/0136944 A1* | 5/2014 | Harris | .................. | G06F 16/958 715/234 |
| 2015/0156220 A1* | 6/2015 | Baskaran | .................. | G06F 21/6209 726/1 |
| 2018/0039565 A1* | 2/2018 | Rajagopalan | ....... | G06F 11/3476 |

(Continued)

FOREIGN PATENT DOCUMENTS

CN 111782557 B 12/2020

OTHER PUBLICATIONS

Maneesh Jhawar, Founder & CEO, QualityKiosk, Speaks to India Infoline, https://www.qualitykiosk.com/maneesh-Jhawar-founder-ceo.

(Continued)

*Primary Examiner* — Wei Y Zhen
*Assistant Examiner* — Amir Soltanzadeh
(74) *Attorney, Agent, or Firm* — LeonardPatel PC; Sheetal S. Patel; Michael A. Leonard, II

(57) ABSTRACT

A system and a method for performing a test of an application using an automation bot are provided. The method comprises accessing the application to be tested. The method comprises executing the test of the application using the automation bot. The automation bot is configured to interact with one or more other applications. The one or more other applications are different from the application. The method comprises determining one or more test results of the application based on the execution of the test. Further, the method comprises generating a notification indicative of the determined one or more test results.

12 Claims, 15 Drawing Sheets

(56) References Cited

U.S. PATENT DOCUMENTS

| | | |
|---|---|---|
| 2019/0129824 A1 | 5/2019 | Radhakrishnan et al. |
| 2020/0050534 A1* | 2/2020 | Sze ..................... G06F 11/277 |
| 2020/0356469 A1* | 11/2020 | Gupta ................... G06F 3/0484 |
| 2020/0387372 A1* | 12/2020 | Venugopal Kalavathy ................. G06F 9/54 |
| 2021/0191843 A1 | 6/2021 | Stocker et al. |
| 2021/0334384 A1* | 10/2021 | Ranjan ................ G06F 11/3636 |

OTHER PUBLICATIONS

Proactive Application Performance Monitoring, Autom AI, https://www.automai.com/application-performance-monitoring.

Simple Website Testing and Monitoring, Frontendrobot, https://frontendrobot.com.

International Search Report and Written Opinion, dated Jun. 7, 2022, PCT Application No. PCT/US21/56970.

\* cited by examiner

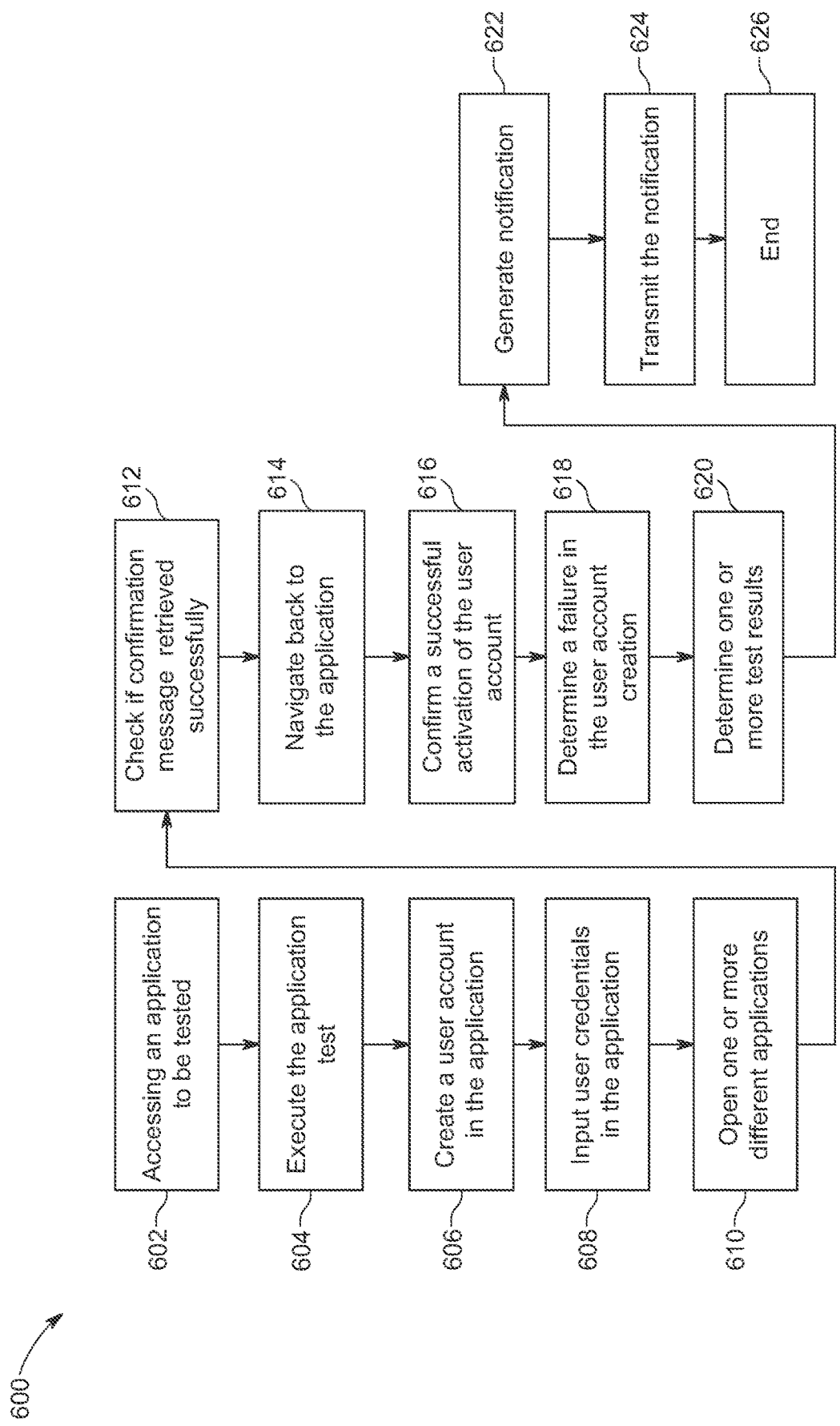

| Alert message | Debug errors |
|---|---|
| Test report | |
| Test scenario | User sign-up flow |
| Test duration | 10 minutes |
| Test execution mode | Scheduled and Regular |
| Web application name | abc.com |
| Other Web application name | email.com |
| Errors | 2 |

FIG. 7G

SYSTEM AND COMPUTER-IMPLEMENTED METHOD FOR TESTING AN APPLICATION USING AN AUTOMATION BOT

FIELD

The present invention generally relates to robotic process automation (RPA), and more specifically, to testing an application using an automation bot.

BACKGROUND

RPA facilitates the proliferation of software automation due to its execution of simple, repeatable tasks that exist in large numbers within an enterprise. An enterprise for purposes of this application is defined as an organization, a business unit, an institution, or an industry that uses RPA for automating manual and repetitive tasks used in carrying out their internal or external processes or transactions. The enterprise makes use of computing systems for carrying out these various processes and transactions in one way or the other. Generally, RPA applications automate repetitive and manually intensive activities of a computing system. The manually intensive activities are performed by software robots using RPA tools. Currently, available RPA tools help a user to test performance of an application. For purposes of explanation, the application may be a workflow or software application, such as a web application or a native application which is being developed or is already developed and deployed for automating a process of the enterprise using RPA. These processes may include such as an email account access process, a sales related process, a CRM process, a ticketing process, an inventory management process, a human resources management process, and the like. Thus, the software application is developed for automating one or more such processes using application development tools, which may be RPA design tools in some applications. In most cases, a synthetic test is used for testing the performance of the application. The synthetic test checks efficiency and functionality of the application. In many cases, synthetic tests do not accurately assess the performance of the application due to the presence of complex scenarios in the applications. For example, a complex scenario may include a sign-up test scenario for an email access application, that involves interacting with other applications, such as accessing a user's email account from another email web application for retrieving a confirmation message for the sign-up workflow.

Typically, a synthetic test may run a script that includes codes with instructions to perform a series of steps for performing the test of the application. For purposes of explanation, the application corresponds to at least a web application or a native application such as a software application installed on a user device. The user device may be a computer, a laptop, a mobile, or the like.

In some cases, manual intervention is needed for complex scenarios such as a test scenario that requires accessing multiple applications. This may include a test scenario for a user sign-up functionality of the web application, a test scenario for the native application and a corresponding set of components of the native application, etc. The native application may be developed in a specific programming language for specific platform (e.g., objective C for iOS or Java for Android operating system). To that end, the test scenario for the native application may include testing a set of components such as one or more server-side components and/or one or more web components of the native application. The web components correspond to web platform Application Programming Interfaces (APIs) for creating customized and reusable encapsulated tags (Hypertext Mark-up language tags) for multiple web pages corresponding to the native application. Some examples of the web components include, but are not limited to, custom elements, HTML templates, Document Object Model (DOM) elements or the like.

Thus, execution of test cases for testing the native application require accessing a specific platform corresponding to the native application as well as accessing multiple interface components such as multiple web pages. The webpage may require expert skills of a tester to develop corresponding test scripts for the test cases.

Therefore, there is a need for a system and a method to overcome the afore-mentioned limitations and provide an enhanced solution for complex test scenarios of the applications.

SUMMARY

Certain embodiments of the present invention may provide solutions to the problems and needs in the art that have not yet been fully identified, appreciated, or solved by currently available RPA tools. For example, some embodiments of the present invention pertain to testing an application using an automation bot and based on synthetic test cases.

In an embodiment, a system for performing a test of an application using an automation bot is provided. The system comprises a memory configured to store one or more computer-executable instructions, and at least one processor configured to execute the one or more computer-executable instructions to access the application to be tested. The at least one processor is further configured to execute the one or more instructions to execute the test of the application using the automation bot. The automation bot is configured to interact with one or more other applications. The one or more other applications are different from the application. The at least one processor is configured to execute the one or more instructions to determine one or more test results for the executed test of the application. The at least one processor is further configured to execute the one or more instructions to generate a notification indicative of the determined one or more test results.

In an embodiment, a computer-implemented method is provided. The computer-implemented method employs at least one hardware processor for executing a series of operations, wherein the series of operations are used for performing a test of an application using an automation bot. The series of operations include accessing the application to be tested. The series of operations includes executing the test of the application using the automation bot. The automation bot is configured to interact with one or more other applications. The one or more other applications are different from the application. The series of operations include determining one or more test results for the executed test of the application. The series of operations further include generating a notification indicative of the determined one or more test results.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 6 is a flow diagram illustrating a method for performing a test of an application using an automation bot, according to an embodiment of the present invention.

FIGS. 7A-7G show graphical user interfaces (GUIs) for performing a test of an application using an automation bot, according to an embodiment of the present invention.

DETAILED DESCRIPTION OF THE EMBODIMENTS

Figure 1:
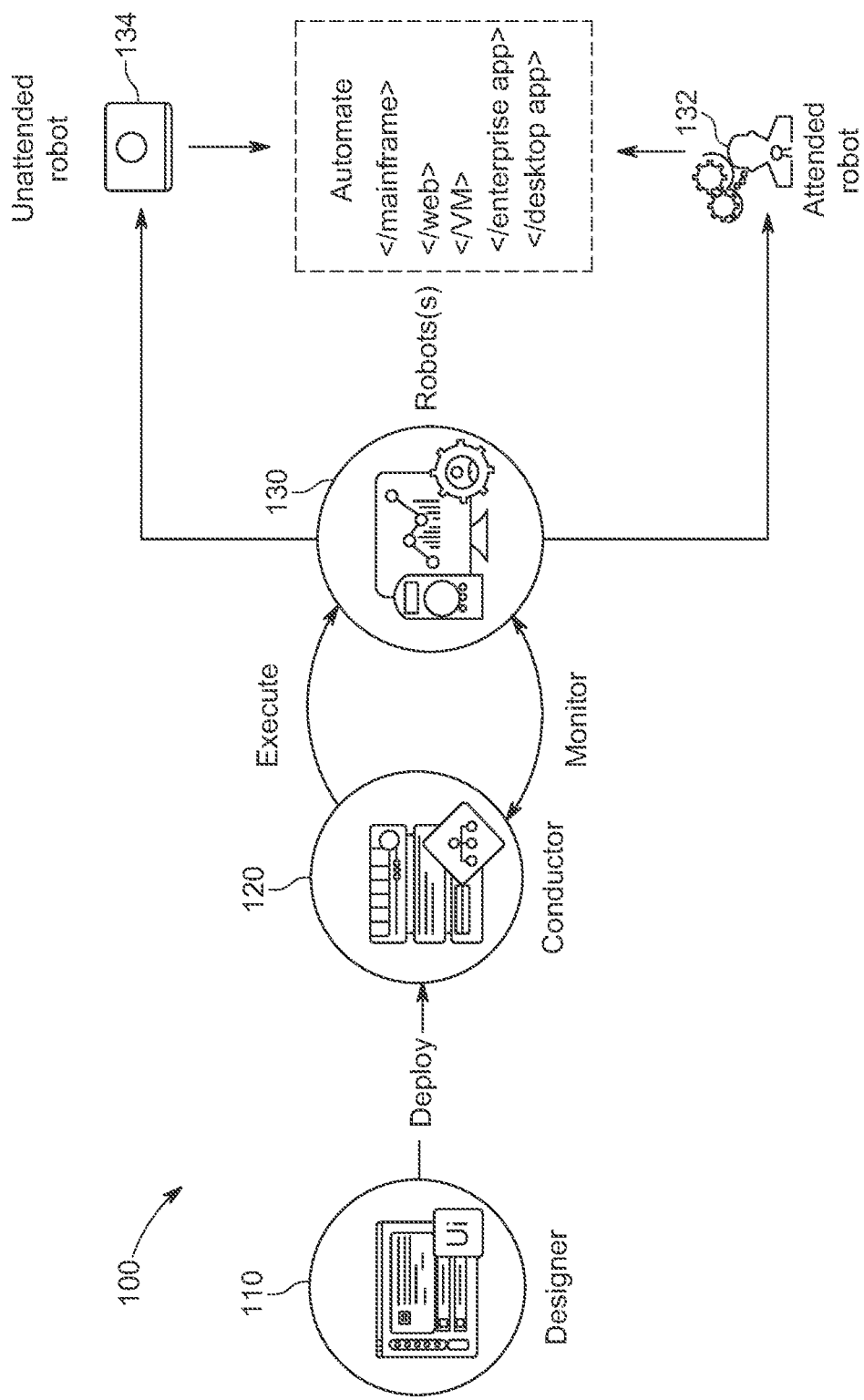
FIG. 1 is an architectural diagram illustrating an RPA system, according to an embodiment of the present invention.

Some embodiments pertain to a system (hereinafter referred to as a "computing system") configured to perform a test of an application using a robot, such as an automation bot. The application corresponds to a web application, a native application, or the like. In some embodiments, the automation bot includes one or more automation bots that are executed in parallel for performing the test of the application. The one or more automation bots are hereinafter collectively referred to as the automation bot. d.

In some embodiments, the system assigns one or more test cases to the automation bot via an Orchestrator®. Each of the one or more test cases may include a set of data and set of conditions to test functionality of the application. For instance, the set of data corresponds to data such as username, password, address, email account, gender, contact number, or the like. The set of conditions corresponds to validation for fields such as email, password, contact number, etc. In one example, a valid password field corresponds to a password length of 8 to 32 alphanumeric characters, a valid contact number field corresponds to 10-digit number with 2 country codes, and the like.

In some cases, the automation bot executes the one or more test cases in a scheduled manner. In the scheduled execution, the one or more test cases are executed at a pre-planned time and at a predetermined time interval. For instance, the one or more test cases are executed on a regular time interval of 10 minutes. In some other cases, the automation bot executes the one or more test cases in a build-driven manner such as a continuous integration/continuous delivery (CI/CD) pipeline. In the CI/CD pipeline, the one or more test cases are executed in continuous testing and integration of the application.

In some embodiments, the automation bot interacts with one or more different applications during the testing of the application. In one embodiment, the testing of the application corresponds to testing of a user account creation workflow in the application. For example, the application corresponds to a web application such as an e-commerce website that includes a user sign-up or registration functionality for the user account creation workflow. To that end, the automation bot creates the user account in the web application using a set of user credentials such as a username, an email account, and a password. A confirmation message is sent to an email account provided for the user account creation. The confirmation message may include at least one of a confirmation code, an activation link, a one-time password (OTP) and/or the like. Further, the automation bot determines a status of the confirmation message from the email account. The status of the confirmation message is either of present or not present. To that end, the automation bot accesses the email account in a new interface component, such as a new web page, and retrieves the confirmation message from the email account based on the determination of the status. After retrieving the confirmation message, the automation bot processes the configuration message in the web application by navigating a control of processing back to the web application from the new web page.

In another embodiment, the testing of the application corresponds to testing a native application. For example, the native application corresponds to a software application such as a Microsoft Office 365® The testing of native application may include testing a corresponding set of components of native application such as web components of native application (e.g., web platform Application Programming Interfaces (APIs)) and server-side components (e.g., back-end scripts or codes written at server-side) of native application. To that end, the automation bot simulates user activity for interacting with the native application and corresponding set of components of the native application in a web browser. For instance, the automation bot opens a document such as a word document in the native application, upload/download the document in the web browser, or the like. In some cases, the native application may correspond to a mobile application. In such cases, the testing for the mobile application using the automation bot may include emulating corresponding platform of the mobile application in a virtual machine. Using the emulated platform, the automation bot executes testing of the mobile application and corresponding set of components of the mobile application similar to that of the test execution of the native application.

The system may also determine one or more test results of the web application based on the testing of the web application. Furthermore, the system may generate a notification indicative of the determined one or more test results. In some embodiments, the notification is transmitted to a user device via an application interface. The notification includes an alert message and a test report indicative of one or more errors associated with the one or more test results. In some embodiments, the one or more errors correspond to the registration functionality of the web application. For instance, the one or more errors include Hypertext Transfer Protocol (HTTP) errors indicative of a fault at the web application, an invalid email account, no confirmation message in the email account, a request time-out error, unexpected value error, transient network error, or the like.

Some embodiments incorporate use of computationally efficient technologies like robotic process automation (RPA) to provide high degree of computational efficiency, by providing improved execution time and reduced storage requirements and at the same time, less complexity at user device level. This is because the "system" may be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the embodiments in any way but is intended to provide one example of the many embodiments. Indeed, some embodiments may be implemented in localized and distributed forms consistent with computing technology, including cloud computing systems. These and other architectural configurations are discussed in the following description, without limiting the scope of the embodiments of the present invention.

FIG. 1 is an architectural diagram illustrating an RPA system 100, according to an embodiment of the present invention. RPA system 100 includes a designer 110 that allows a developer (e.g., a technical user) or a user (e.g., a non-technical user) to design and implement a plurality of automations for automating manual operations of activities or workflows for testing a web application. In some example embodiments, workflows include sign-up workflows for testing functionality of the web application. Designer 110 provides a solution for application integration, as well as automating third-party applications, administrative Information Technology (IT) tasks, and business IT processes. Designer 110 further facilitates development of an automation package, which is a graphical representation of a business process. Simply put, designer 110 facilitates the development and deployment of the plurality of automations.

The automation project enables automation of rule-based processes by giving the developer control of the execution order and the relationship between a custom set of steps developed in a workflow, defined herein as "activities" for the web application testing. One commercial example of an embodiment of designer 110 is UiPath Studio Pro™. Each activity includes an action, such as clicking a button, reading a file, writing to a log panel, typing into a text box, hovering over a GUI element, etc. In some embodiments, workflows can be nested or embedded.

Some types of workflows include, but are not limited to, sequences, flowcharts, Finite State Machines (FSMs), and/or global exception handlers. Sequences are particularly suitable for linear processes, enabling flow from one activity to another without cluttering a workflow. Flowcharts are particularly suitable to more complex business logic, enabling integration of decisions and connection of activities in a more diverse manner through multiple branching logic operators. FSMs are particularly suitable for large workflows. FSMs use a finite number of states in their execution, which can be triggered by a condition (i.e., transition) or an activity. Global exception handlers are particularly suitable for determining workflow behavior when encountering an execution error and for debugging processes.

Once a workflow is developed in designer 110, execution of business processes is orchestrated by a conductor 120, which orchestrates one or more robots 130 that execute the workflows developed in designer 110. One commercial example of an embodiment of conductor 120 is UiPath Orchestrator™ Conductor 120 facilitates management of the creation, monitoring, and deployment of resources in an environment. Conductor 120 acts as an integration point with third-party solutions and applications. In an embodiment, conductor 120 is integrated with a web based user interface.

Conductor 120 manages a fleet of robots 130, connecting and executing robots 130 from a centralized point. Types of robots 130 that are managed include, but are not limited to, attended robots 132, unattended robots 134, development robots (similar to the unattended robots 134, but used for development and testing purposes), and nonproduction robots (similar to the attended robots 132, but used for development and testing purposes). The attended robots 132 are triggered by user events and operate alongside a human on the same computing system. The attended robots 132 are used with conductor 120 for a centralized process deployment and logging medium. Attended robots 132 help a human user accomplish various tasks, and are triggered by the user events. In some embodiments, processes are not started from conductor 120 on this type of robot and/or they do not run under a locked screen. In certain embodiments, the attended robots 132 are started from a robot tray or from a command prompt. The attended robots 132 run under human supervision in some embodiments.

The unattended robots 134 run unattended in virtual environments and automate many processes. The unattended robots 134 are responsible for remote execution, monitoring, scheduling, and providing support for work queues. Debugging for all robot types is run in designer 110 in some embodiments. Both the attended robots 132 and unattended robots 134 automate various systems and applications including, but not limited to, mainframes, web applications, Virtual machines (VMs), enterprise applications (e.g., those produced by SAP®, SalesForce®, Oracle®, etc.), and computing system applications (e.g., desktop and laptop applications, mobile device applications, wearable computer applications, etc.).

Conductor 120 has various capabilities including, but not limited to, provisioning, deployment, configuration, queueing, monitoring, logging, and/or providing interconnectivity. Provisioning includes creating and maintenance of connections between robots 130 and conductor 120 (e.g., a web application). Deployment includes assuring the correct delivery of package versions to the assigned robots 130 for execution. Configuration includes maintenance and delivery of robot environments and process configurations. Queueing includes providing management of queues and queue items. Monitoring includes keeping track of robot identification data and maintaining user permissions. Logging includes storing and indexing logs to a database (e.g., an SQL database) and/or another storage mechanism (e.g., ElasticSearch®, which provides an ability to store and quickly query large datasets). Conductor 120 provides interconnectivity by acting as the centralized point of communication for the third-party solutions and/or applications.

Robots 130 can be execution agents that run workflows built in designer 110. One commercial example of some embodiments of the robot(s) 130 is UiPath Robots™ In some embodiments, robots 130 install the Microsoft Windows® Service Control Manager (SCM)-managed service by default. As a result, robots 130 can open interactive Windows® sessions under the local system account, and have rights of a Windows® service.

In some embodiments, robots 130 are installed in a user mode. For such robots 130, this means they have the same rights as the user under which a given robot 130 has been installed. This feature is also available for High Density (HD) robots, which ensure full utilization of each machine at its maximum potential. In some embodiments, any type of robots 130 can be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows' sessions and act as a proxy between the conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. The user mode robot services can be trusted with and manage the credentials for robots 130. A Windows® application is automatically launched if the SCM-managed robot service is not installed.

Executors run given jobs under a Windows' session (i.e., they may execute workflows). The executors are aware of per-monitor dots per inch (DPI) settings. Agents could be Windows® Presentation Foundation (WPF) applications that display the available jobs in the system tray window. The agents could be a client of the service. The agents request to start or stop jobs and change settings. The command line is a client of the service. The command line is a console application that requests to start jobs and waits for their output.

Having components of robots 130 split as explained above helps developers, support users, and computing systems more easily run, identify, and track what each component is executing. Special behaviors can be configured per component this way, such as setting up different firewall rules for the executor and the service. The executor is always aware of the DPI settings per monitor in some embodiments. As a result, the workflows can be executed at any DPI, regardless of the configuration of the computing system on which they were created. Projects from designer 110 can also be independent of a browser zoom level in some embodiments. For applications that are DPI-unaware or intentionally marked as unaware, DPI is disabled in some embodiments.

Figure 2:
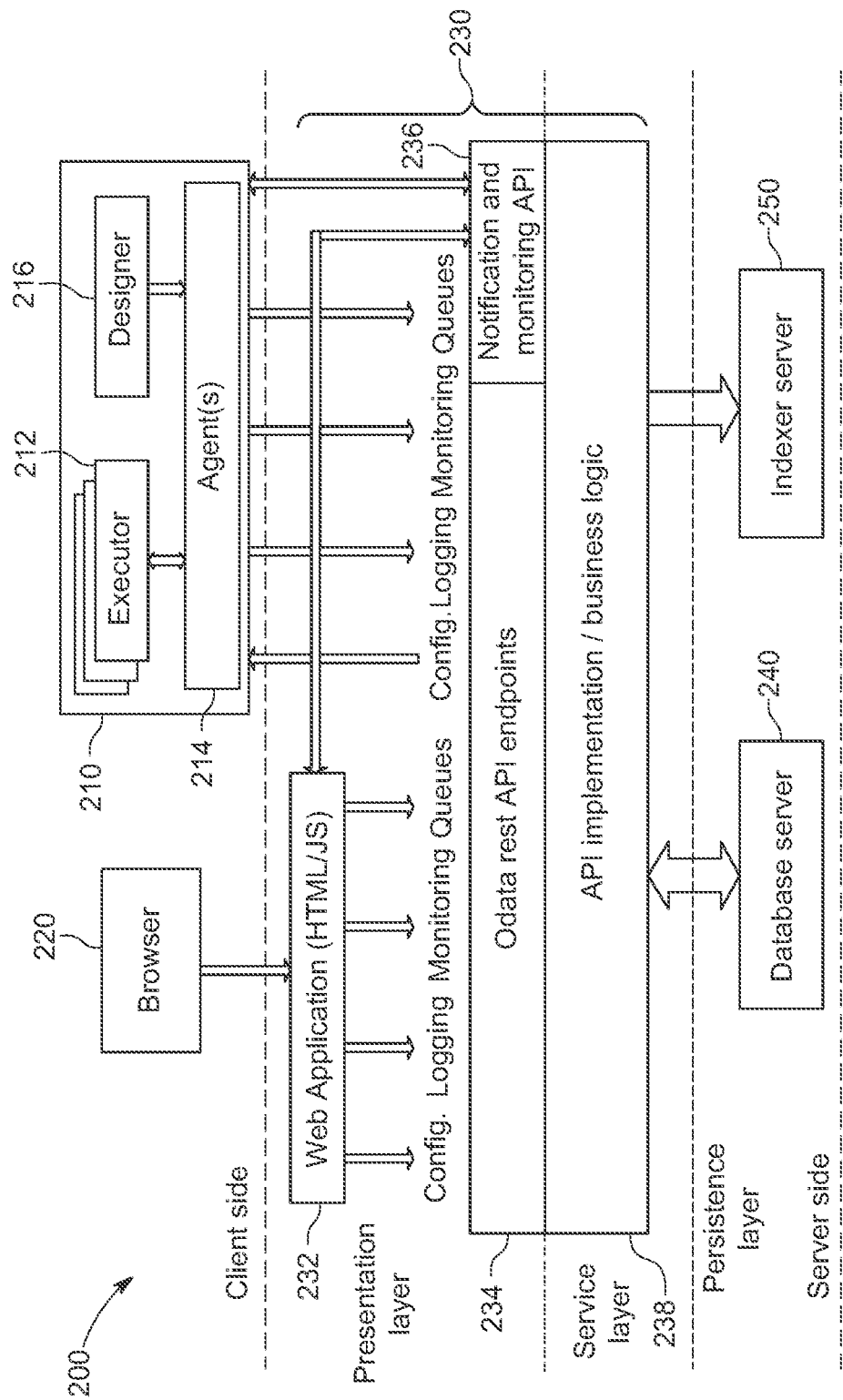
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may not be a part of, RPA system 100 of FIG. 1. It should be noted that a client side, a server side, or both, may include any desired number of the computing systems without deviating from the scope of the invention. On the client side, a robot application 210 includes executors 212, an agent 214, and a designer 216 (for instance, the designer 110). However, in some embodiments, designer 216 is not running on robot application 210. Executors 212 are running processes. Several business projects (i.e. executors 212) run simultaneously, as shown in FIG. 2. Agent 214 (e.g., the Windows® service) is the single point of contact for all executors 212 in this embodiment. All messages in this embodiment are logged into a conductor 230, which processes them further via a database server 240, an indexer server 250, or both. As discussed above with respect to FIG. 1, executors 212 are robot components.

In some embodiments, a robot represents an association between a machine name and a username. The robot manages multiple executors at the same time. On computing systems that support multiple interactive sessions running simultaneously (e.g., Windows® Server 2012), there multiple robots are running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 opens a WebSocket channel that is later used by conductor 230 to send commands to the robot (e.g., start, stop, etc.).

On the server side, a presentation layer (a web application 232, an Open Data Protocol (OData) Representative State Transfer (REST) Application Programming Interface (API) endpoints 234, and a notification and monitoring API 236), a service layer (an API implementation/business logic 238), and a persistence layer (the database server 240 and the indexer server 250) are included. Conductor 230 may include web application 232, the OData REST API endpoints 234, the notification and monitoring API 236, and the API implementation/business logic 238. In some embodiments, most actions that a user performs in an interface of conductor 230 (e.g., via a browser 220) are performed by calling various APIs. Such actions include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user creates robot groups, assign packages to the robots, analyze logs per robot and/or per process, start and stop robots, etc.

In addition to web application 232, conductor 230 also includes service layer that exposes the OData REST API endpoints 234. However, other endpoints may be included without deviating from the scope of the invention. The REST API is consumed by both web application 232 and agent 214. The agent 214 is the supervisor of the one or more robots on the client computer in this embodiment.

The REST API in this embodiment covers configuration, logging, monitoring, and queueing functionality. The configuration endpoints are used to define and configure application users, permissions, robots, assets, releases, and environments in some embodiments. Logging REST endpoints are used to log different information, such as errors, explicit messages sent by the robots, and other environment-specific information, for instance. Deployment REST endpoints are used by the robots to query the package version that should be executed if the start job command is used in conductor 230. Queueing REST endpoints are responsible for queues and queue item management, such as adding data to a queue, obtaining a transaction from the queue, setting the status of a transaction, etc.

Monitoring REST endpoints monitor web application 232 and agent 214. The notification and monitoring API 236 could be REST endpoints that are used for registering agent 214, delivering configuration settings to agent 214, and for sending/receiving notifications from the server and agent

214. The notification and monitoring API 236 also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 manages queues and queue items. In some embodiments, database server 240 stores messages logged by the robots (in addition to or in lieu of indexer server 250).

Indexer server 250, which is optional in some embodiments, stores and indexes the information logged by the robots. In certain embodiments, indexer server 250 could be disabled through the configuration settings. In some embodiments, indexer server 250 uses ElasticSearch®, which is an open source project full-text search engine. The messages logged by robots (e.g., using activities like log message or write line) are sent through the logging REST endpoint(s) to indexer server 250, where they are indexed for future utilization.

Figure 3:
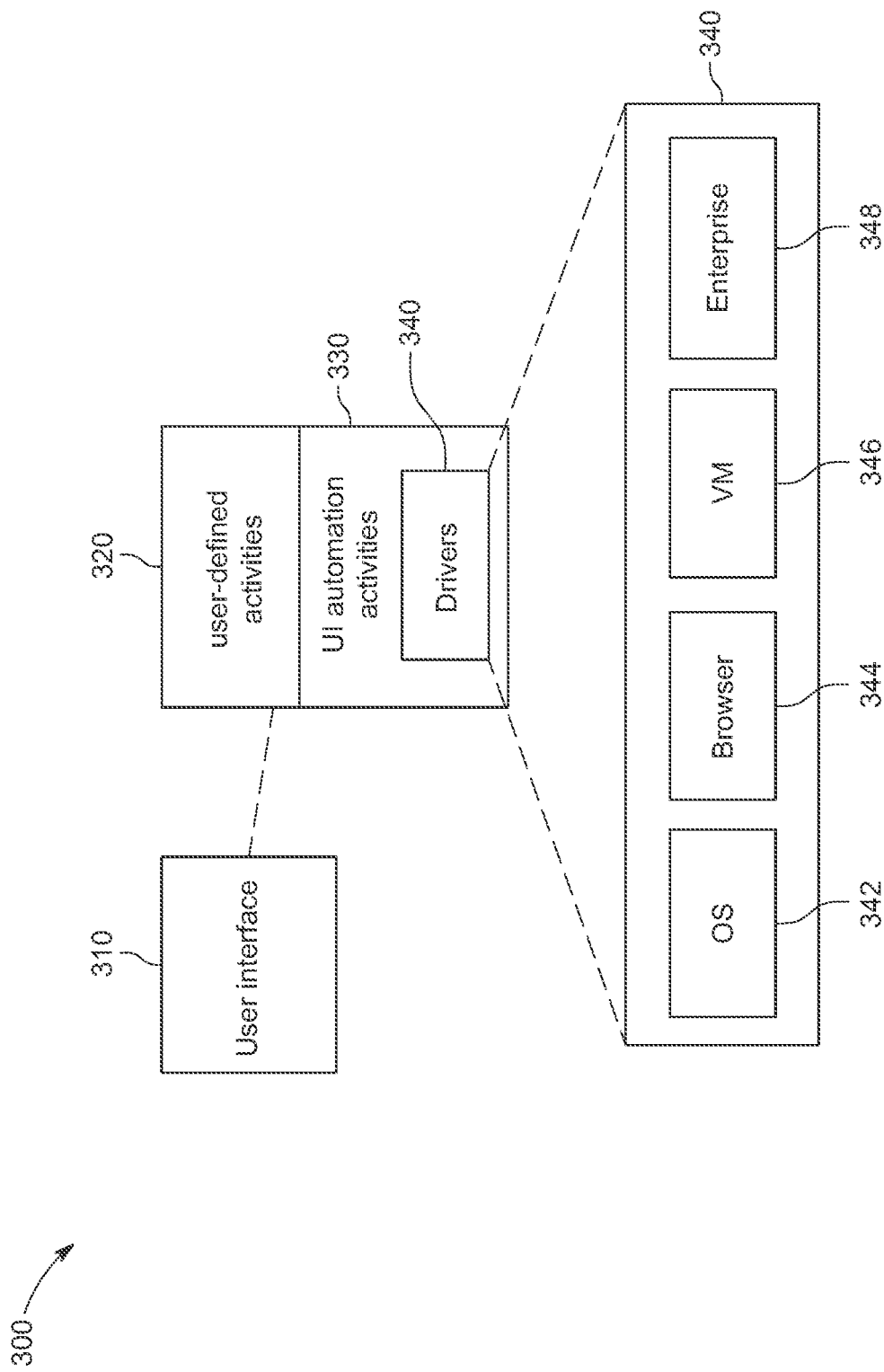
FIG. 3 is an architectural diagram illustrating the relationship between a designer, activities, and drivers, according to an embodiment of the present invention.

FIG. 3 is an architectural diagram illustrating a relationship 300 between a user interface 310, user-defined activities 320, User Interface (UI) automation activities 330, and drivers 340, according to an embodiment of the present invention. Per the above, user interface 310 comprises an interface between an end user and an RPA application. When the end user is developer or a tester, trying to generate or create RPA applications or workflows for testing a web application using a robot, user interface 310 may include an application design module or environment, such as UiPath® Designer. The RPA application or workflow may be related to automation of UI access operations, as defined by various types of UI automation activities 330. UI automation activities 330 may be configurable by the user, such as by including an application interface for testing the web application within user interface 310. A user interface embodied in this manner is illustrated in FIGS. 7A-7G and will be described in detail with description of FIGS. 7A-7G.

In some embodiments, the workflows include user-defined activities 320 and UI automation activities 330. Some embodiments are able to identify non-textual visual components in an image associated with the workflows, such as the label data, which is an image of the artwork label, using computer vision (CV) activities. Some CV activities pertaining to such components may include, but are not limited to, extracting of text from segmented label data using optical character recognition (OCR), fuzzy text matching, cropping of segmented label data using ML, comparison of extracted text in label data with ground truth data and the like. In some embodiments, there may be hundreds or even thousands of activities that may be implemented in user defined activities 320 component. However, any number and/or type of activities may be available without deviating from the scope of the invention.

UI automation activities 330 are a subset of special, lower level activities that are written in lower level code (e.g., CV activities) and facilitate interactions with the screen. In some embodiments, UI automation activities 330 include the type activity, the click activity, or the hover activity as discussed above. UI automation activities 330 facilitate these activities via drivers 340 that allow the robot to interact with the desired software. For instance, drivers 340 include Operating System (OS) drivers 342, browser drivers 344, VM drivers 346, enterprise application drivers 348, etc.

Drivers 340 are configured to interact with OS drivers 342 at a low level looking for hooks, monitoring for keys, etc. They may facilitate integration with Chrome®, IE®, Citrix®, SAP®, etc. For instance, the "click" activity performs the same role in these different applications via drivers 340. Drivers 340 may enable execution of an RPA application in an RPA system. Browser drivers 344 include a web-based user interface for a user or developer to interact.

Figure 4:
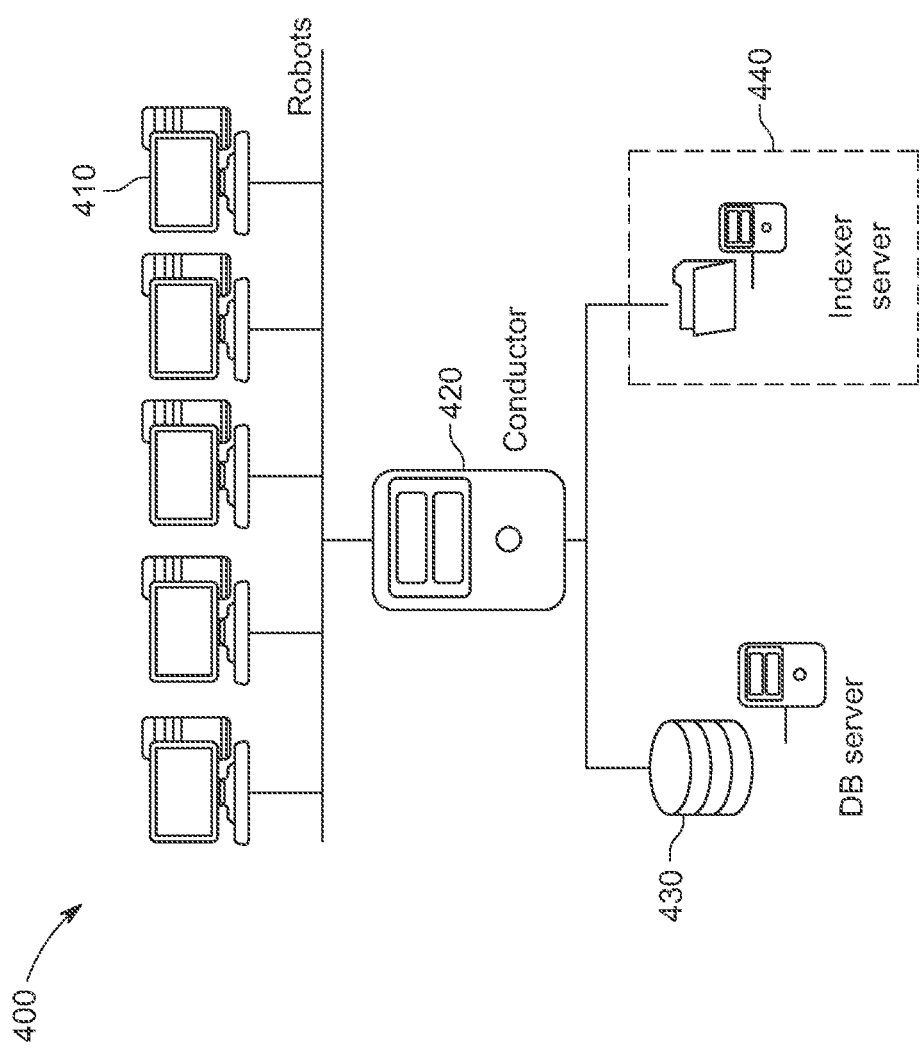
FIG. 4 is an architectural diagram illustrating another RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 (for instance, running robots). In some embodiments, multiple client computing systems 410 are configured to compare the multiple RPA packages and RPA workflows. Multiple client computing systems 410 are further configured to communicate with a conductor computing system 420 via a web application running thereon. Conductor computing system 420, in turn, is configured to communicate with a database server 430 (for instance, the database server 240) and an optional indexer server 440 (for instance, the optional indexer server 250).

With respect to the FIGS. 1 and 3, it should be noted that while the web application is used in these embodiments, any suitable client/server software may be used without deviating from the scope of the invention. For instance, the conductor may run a server-side application that communicates with non-web-based client software applications on the client computing systems. The server may be implemented in localized and distributed forms consistent with computing technology, including cloud computing systems.

Figure 5:
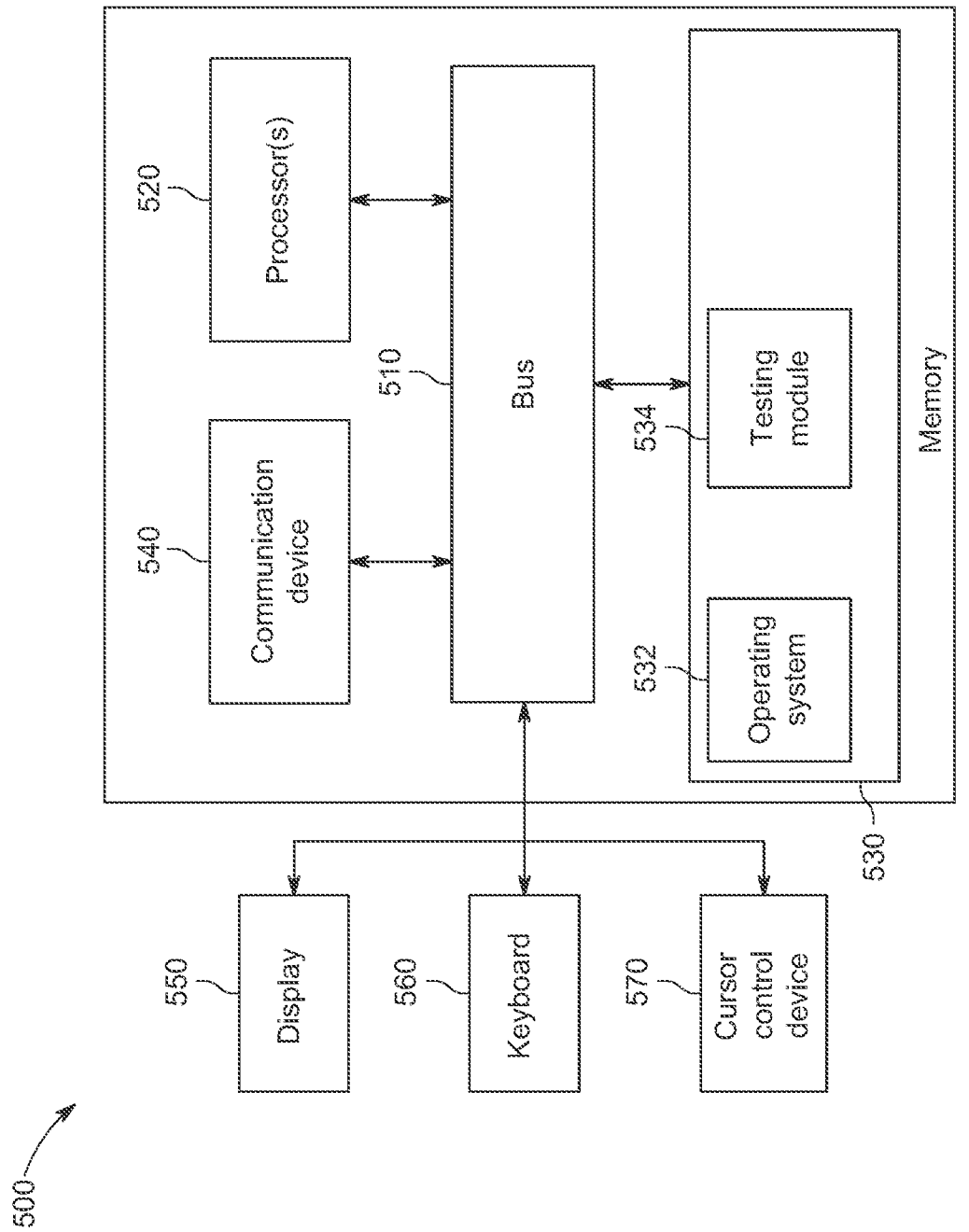
FIG. 5 is an architectural diagram illustrating a computing system configured for performing a test of an application using an automation bot, according to an embodiment of the present invention.

FIG. 5 is an architectural diagram illustrating a computing system 500 configured for performing a test of an application using an automation bot, according to an embodiment of the present invention. In some embodiments, computing system 500 may be one or more of the computing systems depicted and/or described herein. Computing system 500 includes a bus 510 or other communication mechanism for communicating information, and processor(s) 520 coupled to bus 510 for processing information. Processor(s) 520 could be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 520 may also have multiple processing cores, and at least some of the cores may be configured to perform specific functions. Multi-parallel processing is used in some embodiments. In certain embodiments, at least one of the processor(s) 520 can be a neuromorphic circuit that includes processing elements that mimic biological neurons. In some embodiments, neuromorphic circuits do not require the typical components of a Von Neumann computing architecture.

Computing system 500 further includes a memory 530 for storing information and instructions to be executed by the processor(s) 520. Memory 530 may be comprised of any combination of Random Access Memory (RAM), Read Only Memory (ROM), flash memory, cache, static storage such as a magnetic or optical disk, or any other types of non-transitory computer-readable media or combinations thereof. The non-transitory computer-readable media may be any available non-transitory media that may be accessed by processor(s) 520 and may include volatile media, non-volatile media, or both. The media may also be removable, non-removable, or both.

Additionally, computing system 500 includes a communication device 540, such as a transceiver, to provide access to a communications network via a wireless and/or wired connection. In some embodiments, communication device 540 is configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, the communication device 540 includes one or more antennas that are singular, arrayed, phased, switched, beamforming, beam steering, a combination thereof, and or any other antenna configuration without deviating from the scope of the invention.

Processor(s) 520 are further coupled via bus 510 to a display 550, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. The display 550 is configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 560 and a cursor control device 570, such as a computer mouse, a touchpad, etc., are further coupled to bus 510 to enable a user to interface with computing system. However, in certain embodiments, a physical keyboard and mouse are not present, and the user interacts with the device solely through display 550 and/or a touchpad (not shown). Any type and combination of input devices may be used as a matter of design choice. In certain embodiments, no physical input device and/or display is present. For instance, the user interacts with computing system 500 remotely via another computing system in communication therewith, or computing system 500 may operate autonomously.

Memory 530 stores software modules that provide functionality when executed by processor(s) 520. The modules include an operating system 532 for computing system 500. The modules further include a testing module 534 configured to perform all, or part of the processes described herein or derivatives thereof for performing a test of a web application using an automation bot.

One skilled in the art will appreciate that a "system", such as the computing system 500, could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code, for instance, includes one or more physical or logical blocks of computer instructions that, for instance, are organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set or may be distributed over different locations including over different storage devices, and may exist, at least partially, merely as electronic signals on a system or network.

In some embodiments, computing system 500 performs testing of an application using the automation bot. The testing of the application corresponds to at least one of a test of a web application, and a test of a native application. In some example embodiments, the testing for the web application corresponds to testing one or more functionalities of workflows of the web application, such as a user account creation workflow in the web application. A flowchart of steps processed by computing system 500 for performing the test of the web application using the automation bot is described next with reference to FIG. 6.

FIG. 6 is a flow diagram illustrating a method 600 for performing a test of an application using an automation bot, according to an embodiment of the present invention. In some embodiments, method 600 is performed by computing system 500. In this embodiment, the test of the application corresponds to a test of a web application using the automation bot. In another embodiment, the test of the application may correspond to a test of another type of application. Method 600 may begin at 602 with accessing the web application to be tested. For instance, the web application is accessed via a web browser. At 604, the web application test is executed using the automation bot. In some embodiments, one or more test cases are assigned to the automation bot for executing the web application test. The one or more test cases include a set of data (e. g., a username, a password, an address, an email account, a gender, a contact number, etc.) and set of conditions (validation for email field, password, etc.) to test functionality of the web application.

In an embodiment, the web application test corresponds to testing of a user account creation workflow in the web application. At 606, the automation bot creates a user account in the web application. At 608, the automation bot inputs a set of user credentials for the user account creation in the web application. The set of user credentials includes at least a username, an email account, and a password. Each of the set of user credentials is inputted to corresponding input fields in the web application. After the set of user credentials are provided, a confirmation message is sent to the email account. The confirmation message includes at least one of a confirmation code, an activation link, and a one-time password (OTP).

At 610, the automation bot interacts with one or more other web applications different from the web application in a new interface element. The one or more other web applications may correspond to an email web application, a payment application, or the like. Further, the new interface element could be a new web page. The new web page may be opened in a new tab or new window, different from the tab or window in which the web application being tested is open. The automation bot may interact with this new interface element by maintaining a flow of interactions and state information of different elements of the web application being test. By this, the automation bot maintains navigation flow of processing including navigating from an interface element in which the application being tested is currently open, to the new interface element for interacting with the other application, and then navigating the control of processing back to the original interface element of the application being tested. For instance, the automation bot opens the new web page to access the email account and determines a status of the confirmation message from the email account. The status of the confirmation message is either of present or not present in the email account. In some cases, the web application may correspond to a user account creation workflow with a payment functionality. In such cases, the automation bot may open another web page to access a web application for the payment.

At 612, a successful retrieval of the confirmation message from the email account is checked. In one embodiment, the automation bot determines whether the confirmation message is in the email account. The automation bot retrieves the confirmation message based on the determination.

At 614, the automation bot navigates back to the web application from the new web page upon a successful retrieval of the confirmation message. At 616, a successful activation of the user account is confirmed based on the confirmation message. At 618, a failure of the user account creation is determined upon an unsuccessful retrieval of the confirmation message. At 620, one or more test results are determined based on the failure of the user account creation in the web application.

At 622, a notification indicative of the determined one or more test results, is generated. At 624, the notification is transmitted to a user device via an application interface. In some embodiments, the notification includes at least an alert message and a test report indicative of one or more errors associated with the one or more test results. In some embodiments, the detected one or more errors include HTTP errors that indicate a faulty at the web application, an invalid email account, no confirmation message in the email account, a request time-out error, unexpected value error, transient network error or the like. At 626, method 600 ends.

The testing of the user account creation workflow in the web application is further shown and described with reference to FIGS. 7A-7F.

Figure 7A:
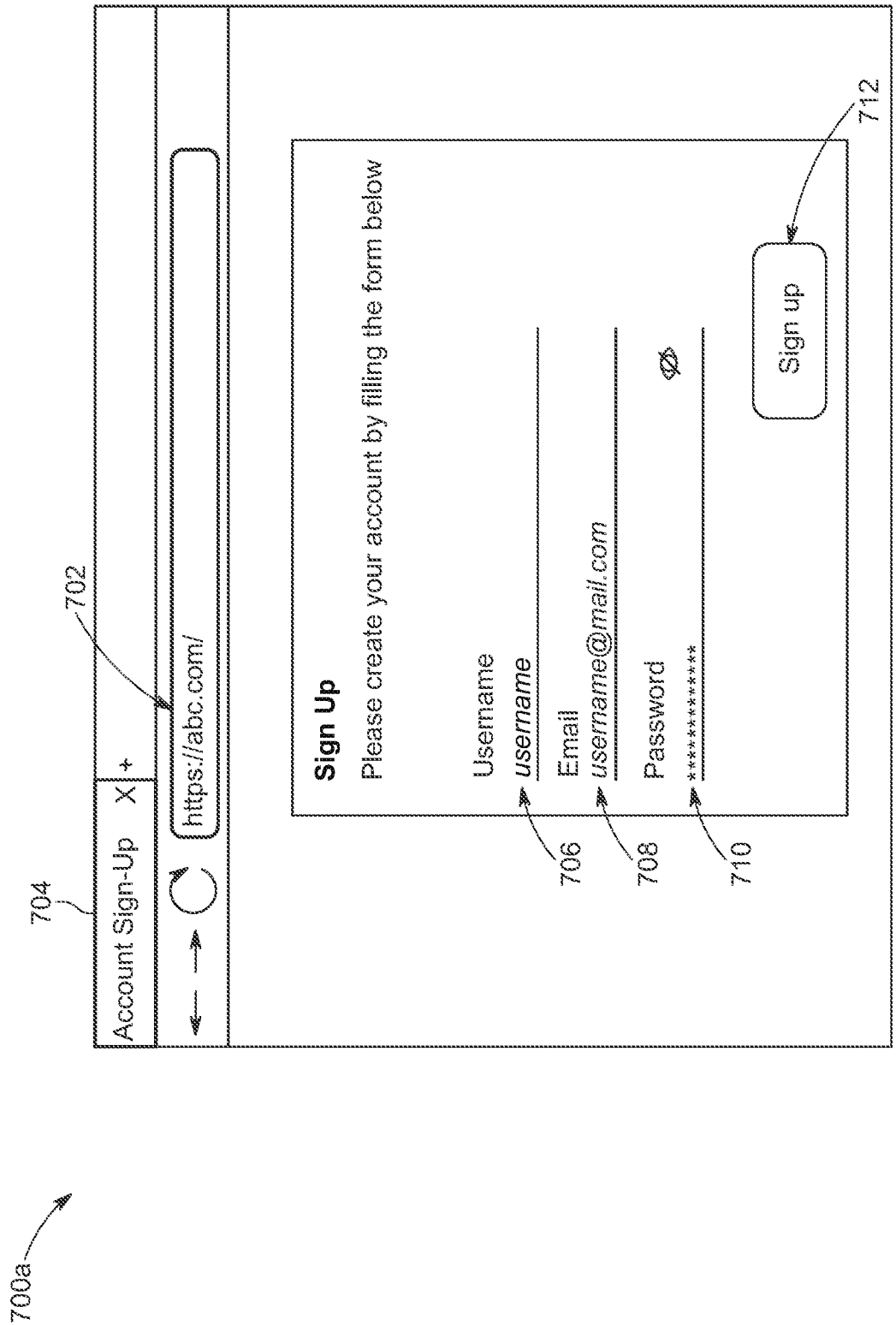

FIG. 7A is a graphical user interface (GUI) 700a of an application interface depicting a web application 702, according to an embodiment of the present invention. As shown in FIG. 7A, web application 702 (e.g., "https://abc.com") is opened in a web page 704. Web page 704 shows a sign-up page with an input field 706, an input field 708 and an input field 710. Input field 706 corresponds to a username field, input field 708 corresponds to an email account field, and input field 710 corresponds to a password field. The automation bot inputs each of a set of user credentials, i.e., a username, an email account and a password in corresponding input field. The username is entered in input field 706, the email account is entered in input field 708, and the password is entered in input field 710. After entering the set of user credentials, the automation bot clicks on button 712.

When the automation bot clicks on button 712, a notification is displayed. This notification is shown in FIG. 7B.

Figure 7B:
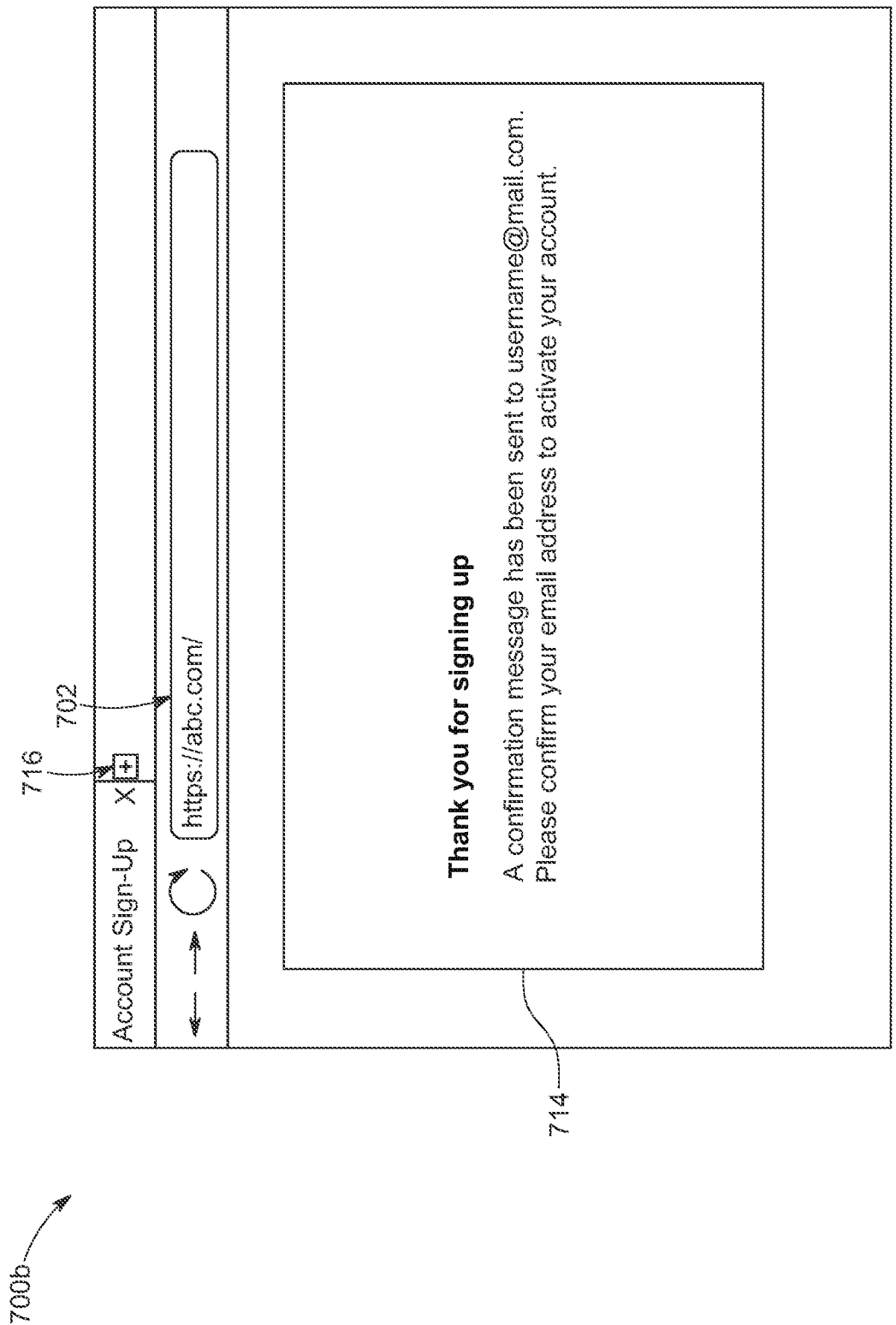

FIG. 7B is a GUI 700b of the application interface depicting a notification 714, according to an embodiment of the present invention. Notification 714 includes a message "A confirmation message has been sent to username@mail.com. Please confirm your email address to activate your account", as shown in FIG. 7B.

Figure 7C:
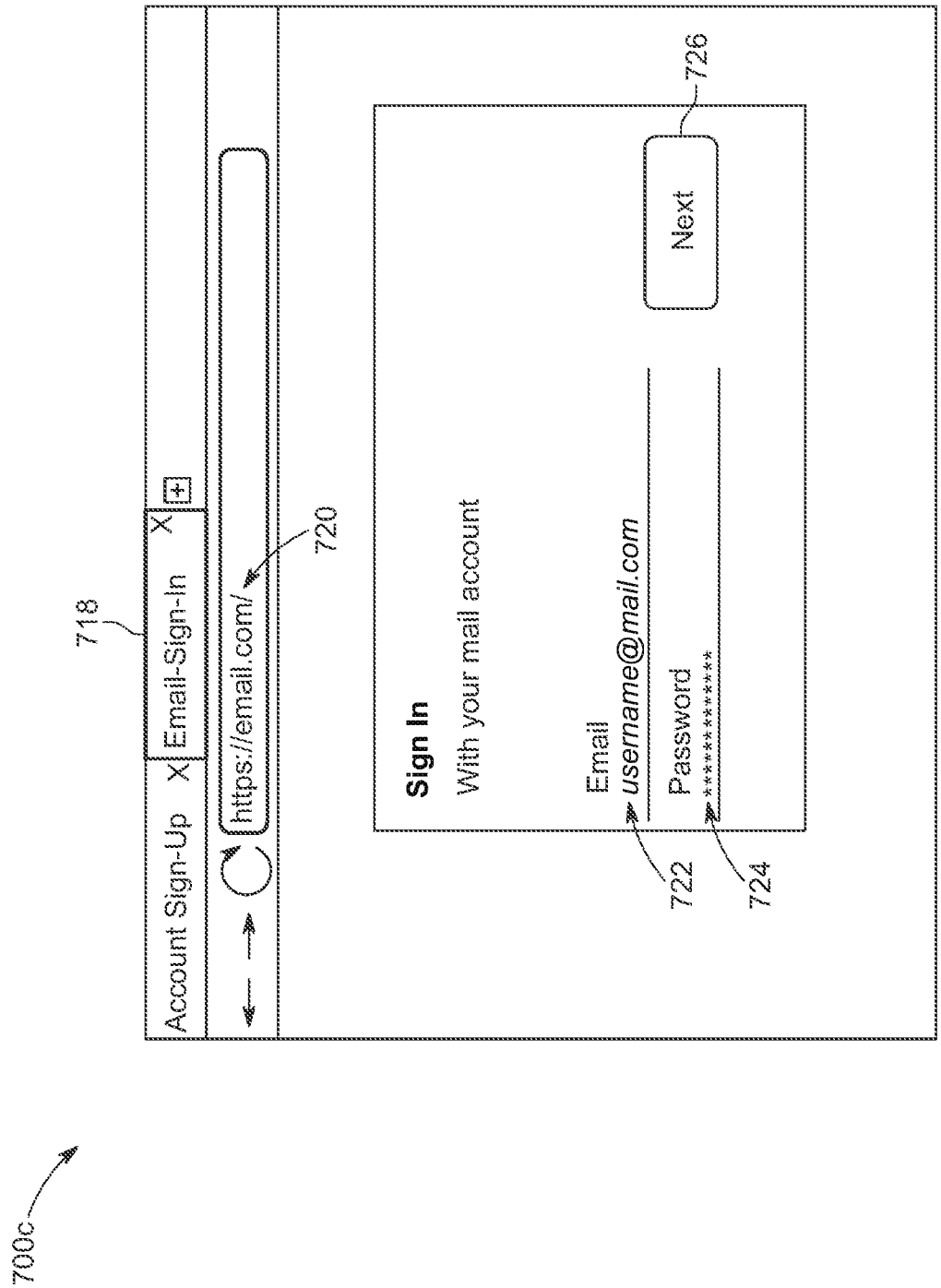

The automation bot continues with the method and clicks on new tab 716 to access the email account See, FIG. 7C, which is a GUI 700c of the application interface depicting a new web page 718, according to an embodiment of the present invention. The automation bot opens a web application 720 in new web page 718 to access the email account and determines a status of the confirmation message from the email account. The automation bot performs a sign-in to the email account in web application 720 by entering login credentials in corresponding input field 722 and input field 724. After entering the login credentials, the automation bot clicks on button 726 to retrieve the confirmation message. See, for example, FIG. 7D.

Figure 7D:
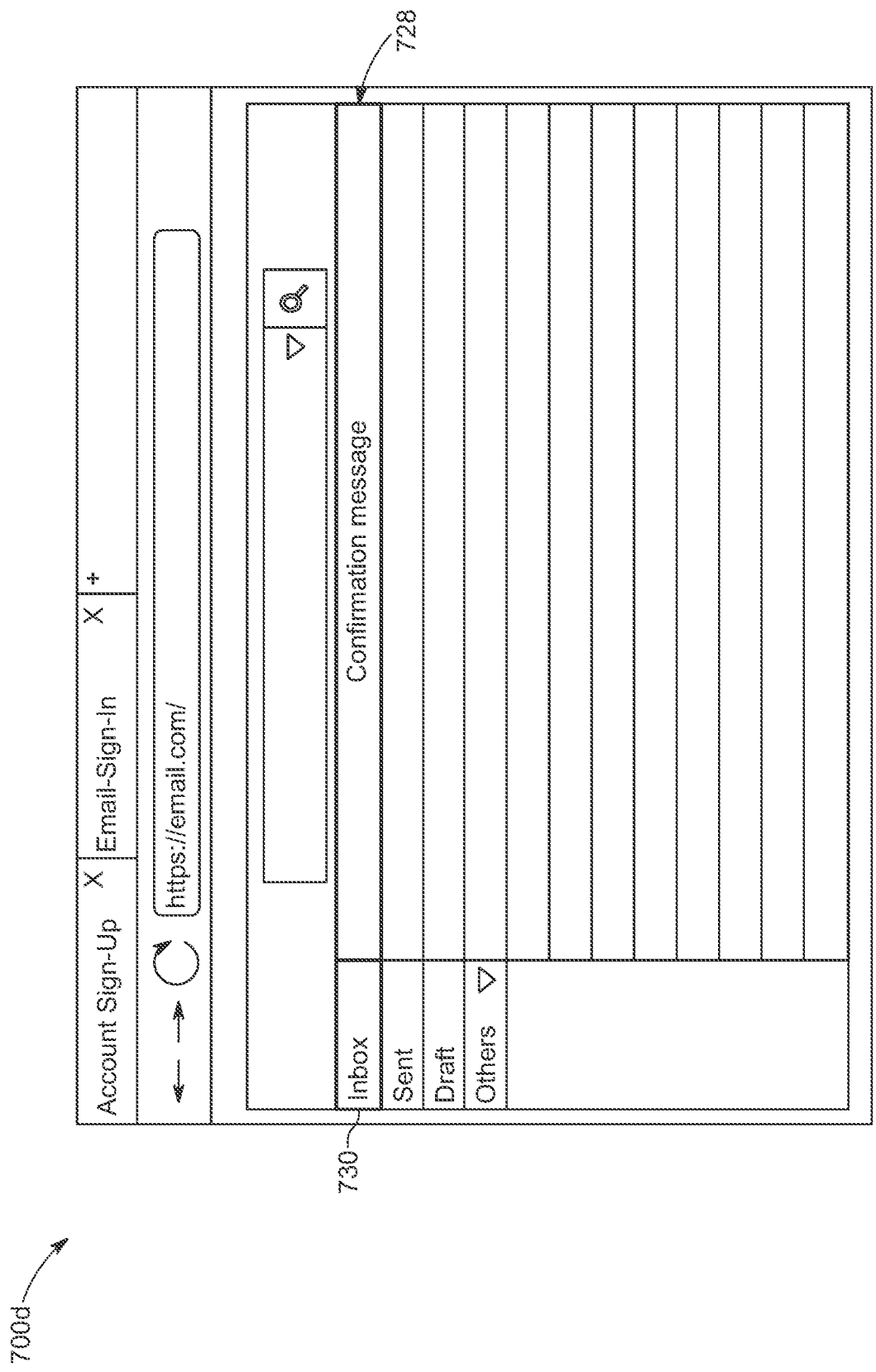
Figure 7E:
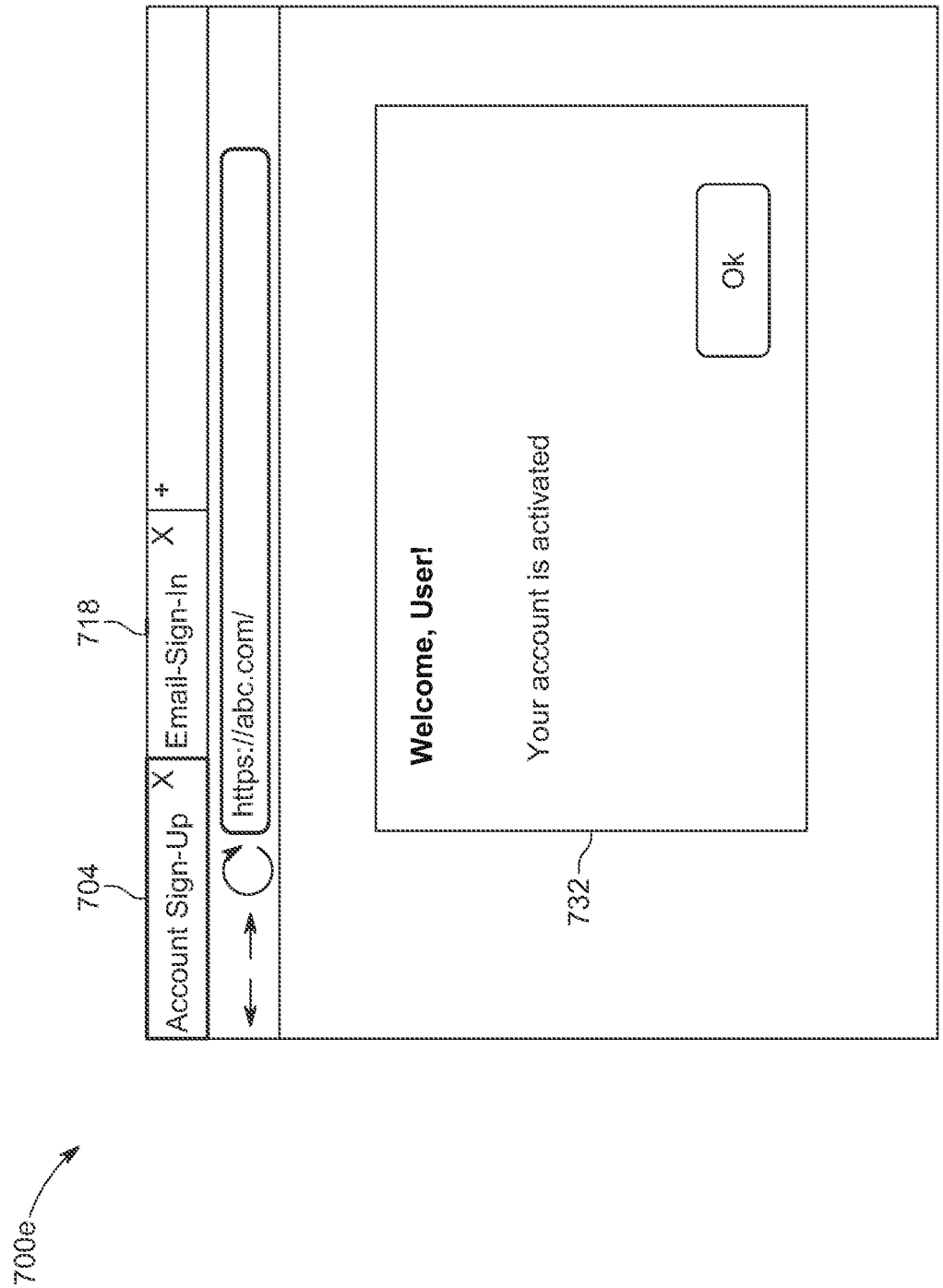

FIG. 7D, which is a GUI 700d depicting a confirmation message 728, according to an embodiment of the present invention. The automation bot retrieves confirmation message 728 from inbox 730 of the email account.

After the retrieval of confirmation message 728, the automation bot navigates back to web page 704 from web page 718. See, for example, FIG. 7E, which is a GUI 700e depicting a message 732 for a successful activation of the user account created in web application 702, according to an embodiment of the present invention. Message 732 includes "Welcome User! Your account is activated".

When there is an unsuccessful retrieval of confirmation message 728, the automation bot determines a failure in the user account creation. This is described next with reference to FIG. 7F.

Figure 7F:
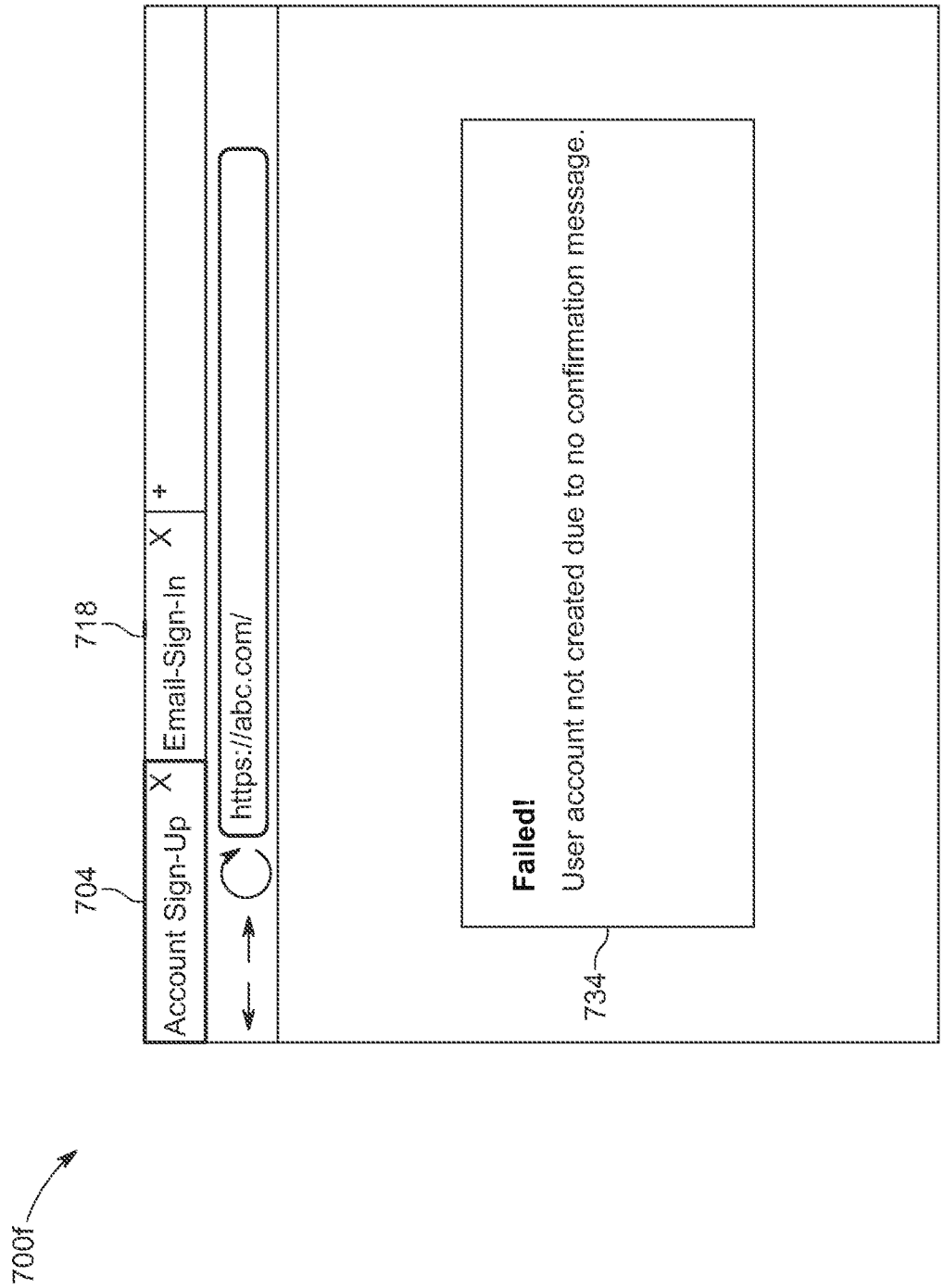

FIG. 7F is a GUI 700f depicting a message 734, according to an embodiment of the present invention. Message 734 includes "Failed! User account not created due to no confirmation message". In some embodiments, one or more test results are determined based on failure in the user account creation in web application 702.

Further, a notification indicative of the determined one or more test results is generated. See, for example, FIG. 7G.

FIG. 7G is a GUI 700g depicting a notification 736, according to an embodiment of the present invention. In this embodiment, notification 736 is transmitted to a user device via an application interface. In some embodiments, notification 736 includes at least an alert message 738 and a test report 740 to indicative of the one or more errors associated with the one or more test results. Test report 740 includes details corresponding to a test scenario, i.e., the user account creation workflow in web application 702, test duration, test execution mode, one or more web applications interacted, detected errors, and/or the like.

Likewise, in some other embodiments, computing system 500 performs testing of a native application. The testing of the native application corresponds to testing one or more functionality workflows of the native application, which is described further in FIG. 8.

Figure 8:
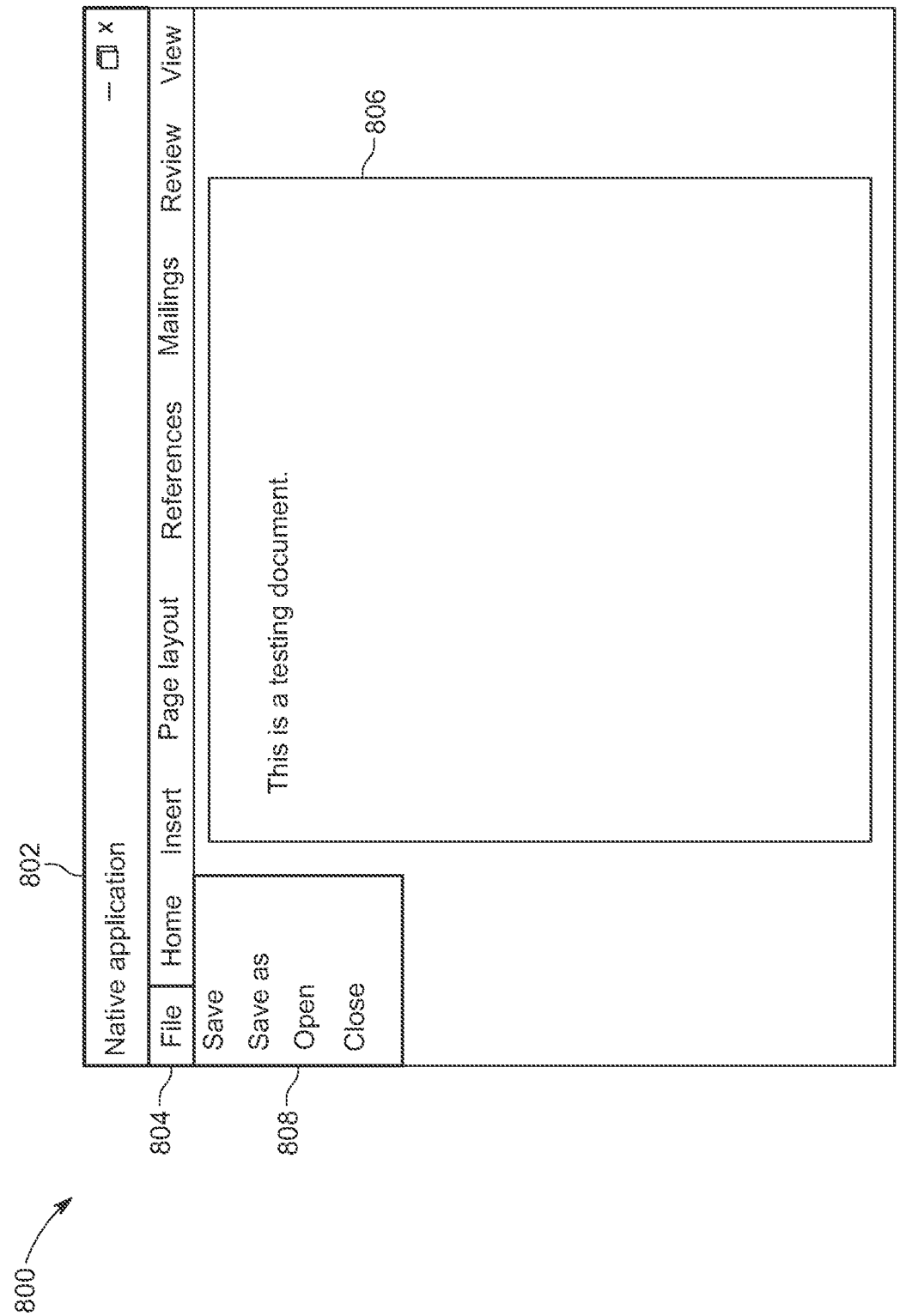
FIG. 8 shows a GUI for performing a test of an application using an automation bot, according to another embodiment of the present invention.

FIG. 8 is a GUI 800 illustrating an application interface of a native application 802, according to an embodiment of the present invention. As shown in FIG. 8, native application 802 is opened in a user device (not shown). The user device may include a computer, a laptop, or the like. An example of native application 802 is Microsoft Office 365®. The testing of native application 802 includes testing a corresponding set of components (not shown) of native application 802. In some embodiments, the set of components include one or more web components of native application 802. In some other embodiments, the set of components include one or more server-side components of native application 802.

To that end, the automation bot opens a document file 806 in native application 802. The automation bot may simulate a user activity. User activity may include clicking on a file option 804. File option 804 includes a drop-down list of options 808 such as save, save as, open, close or the like. The automation bot selects open option in file option 804 to open document file 806 and performs a write operation on document file 806. For purposes of explanation, the write operation may include writing a sentence "This is a testing document".

The automation bot may also save document file 806 after the write operation. For instance, the automation bot clicks on "save as" option in drop-down list of options 808. After saving document file 806, the automation bot uploads document file 806 in an email account. The automation bot accesses the email account in a web browser. The automation bot may access the email account in web page 718, in a similar manner as shown in FIG. 7C. After opening web page 718, the automation bot may navigate back to native application 802 to upload or attach document file 806 to the email account. In this way, the automation bot interacts with other applications, such as web application of the email account in web page 718.

When there is an unsuccessful interaction with the other applications, the automation bot determines a failure in the test execution of native application 802. The failure may correspond to error in uploading document file 806 from native application 802 to the email account, error in accessing the email account, or the like. For instance, the email account may be invalid, web page 718 may not open, or the like due to which the interaction with the other applications may be unsuccessful. Further, the automation bot may determine one or more test results based on the execution of testing native application 802. Furthermore, the automation bot may also generate a notification indicative of the determined one or more test results. The notification is generated in a similar manner, as shown in FIG. 7G.

Figure 9:
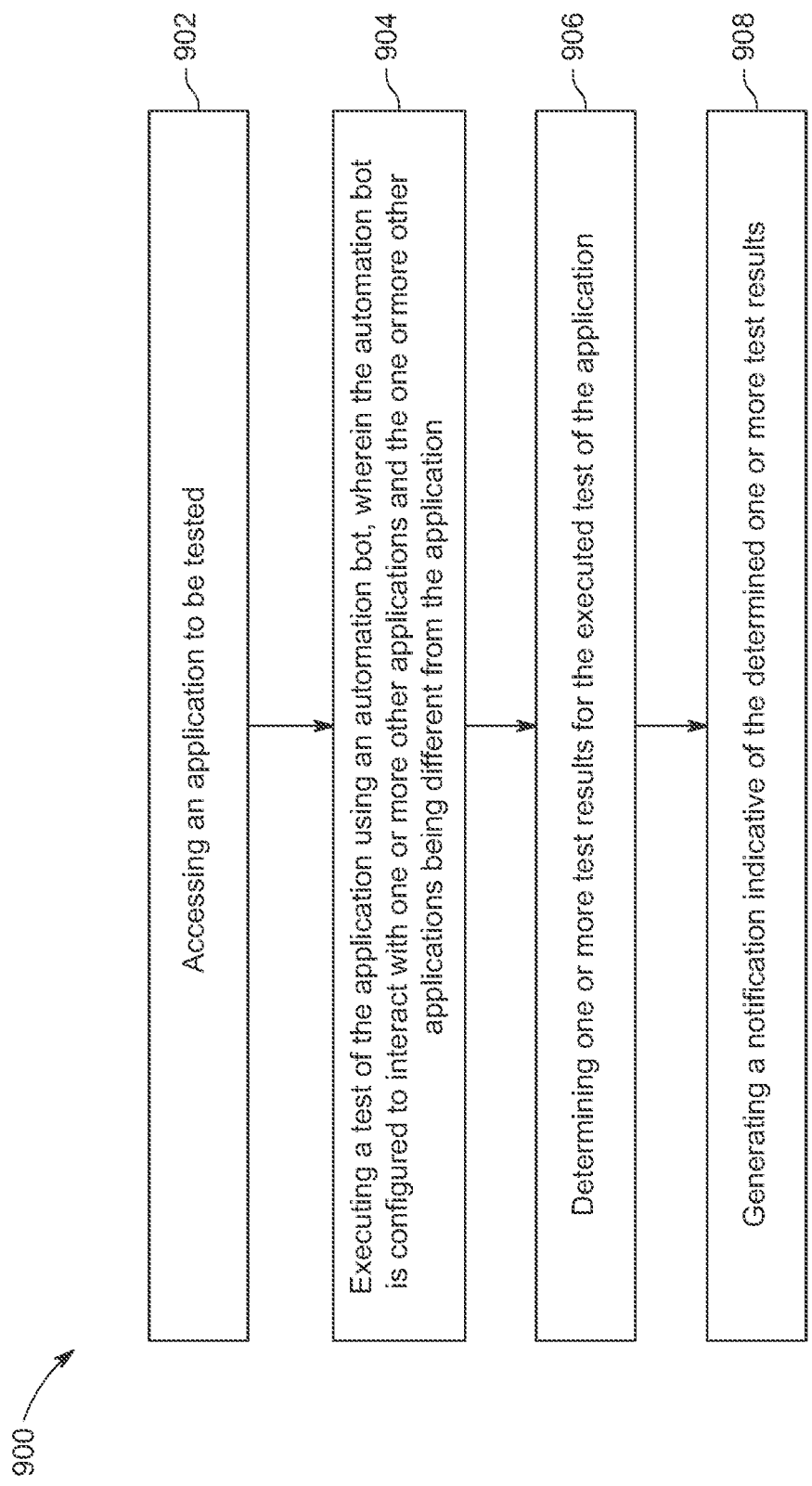
FIG. 9 is a flow diagram illustrating a method for performing a test of an application using an automation bot, according to an embodiment of the present invention.

FIG. 9 is a flowchart illustrating a method 900 for performing a test of an application using an automation bot, according to an embodiment of the present invention. In some embodiment, method 900 may begin at 902 with accessing the application to be tested.

At 904, the test of the application is executed using the automation bot. In some embodiments, the execution of the test corresponds to at least one of a test of a web application such as testing a sign-up functionality in web application 702 of FIGS. 7A and 7B. In other embodiments, the execution of the test corresponds to a test of a native application such as testing native application 802 of FIG. 8. The test of the native application corresponds to test one or more functionality workflows of the native application and a corresponding set of components of the native application. The set of components includes at least one or more web components of the native application and one or more server-side components of the native application. Further, the automation bot interacts with one or more other applications. The one or more other applications are different from the application. For example, the automation bot interacts with web application 720 in new web page 718 of FIG. 7C for retrieving confirmation message 724 of FIG. 7D. After the retrieval, the automation bot navigates back to web application 702 (shown in FIG. 7E). In a similar manner, during testing of native application 802, the automation bot interacts with another application, such as web application 720, for uploading document file 806 from native application 802.

At 906, the automation bot determines one or more test results corresponding to the application based on the execution of the test. In some embodiments, the one or more test results are determined based on a failure in the user account creation (shown in FIG. 7F).

At 908, a notification indicative of the determined one or more test results is generated. For example, the notification (e.g., notification 732 of FIG. 7G) includes at least an alert message and a test report indicative of one or more errors associated with the one or more test results.

In an embodiment, method 900 of FIG. 9 includes configuring a computer program associated with a hardware processor configured to execute a series of operations, wherein the series of operations are used to perform all or some of the steps described in conjunction with the method 900. The hardware processor may, for example, be configured to execute the series of operations associated with method 900 by performing hardware implemented logical functions, executing stored instructions, or executing algorithms for performing each of the operations. Alternatively, the apparatus includes a means for performing each of the operations described above. In this regard, according to an embodiment, examples means for executing the series of operations associated with method 900 include processor 520, which is implemented in system 500 and/or a device or circuit for executing instructions or executing an algorithm for processing information as described above.

The computer program may be implemented in hardware, software, or a hybrid implementation. The computer program may be composed of modules that are in operative communication with one another, and which are designed to pass information or instructions to display. The computer program may be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system for performing a test of an application using an automation bot, comprising:
a memory configured to store one or more computer-executable instructions; and
at least one processor configured to execute the one or more computer-executable instructions to:
access the application to be tested;
execute the test of the application using the automation bot, wherein
the execution of the test of the application corresponds to at least one of a test of a web application, and a test of a native application,
the automation bot is further configured to:
navigate a control of processing to a new interface component for interacting with one or more other applications, and
navigate the control of processing back to the application, upon a successful interaction with the one or more other applications,
the test of the web application corresponds to testing of a user account creation workflow in the web application, and the automation bot is further configured to:
input each of a set of user credentials to corresponding input field in the web application, wherein the set of user credentials comprises at least a username information, an email account information, and a password information, and
retrieve a confirmation message for the email account from the one or more other applications opened in the new interface component, wherein the confirmation message comprises at least one of a confirmation code, an activation link, and a one-time password (OTP),
the automation bot is configured to interact with one or more other applications and includes
access an email account in the new interface component, wherein the new interface component is a new web page or application;
determine a status of the confirmation message from the email account, wherein the status of the confirmation message is either of present or not present;
retrieve the confirmation message based on the determination;
process navigating a control of processing back to the application from the new web page upon a successful retrieval of the confirmation message; and
determine a successful activation of the user account based on the processing of the confirmation message;
determine one or more test results for the executed test of the application; and
generate a notification indicative of the determined one or more test results.

2. The system of claim 1, wherein the automation bot is further configured to determine a failure in the test execution upon an unsuccessful interaction with the one or more other applications.

3. The system of claim 1, wherein the automation bot is further configured to determine a failure in the user account creation workflow upon an unsuccessful retrieval of the confirmation message.

4. The system of claim 1, wherein the test of the native application corresponds to testing of one or more functionalities of workflows of the native application and a corresponding set of components of the native application,
the set of components comprises at least one or more web components of the native application and one or more server-side components of the native application.

5. The system of claim 1, wherein for the generation of the notification, the at least one processor is further configured to execute the one or more computer-executable instructions to transmit the notification to a user device via an application interface.

6. The system of claim 5, wherein the notification comprises at least an alert message and a test report indicative of one or more errors associated with the one or more test results.

7. A method for performing a test of an application using an automation bot, comprising:
- accessing the application to be tested;
- navigating a control of processing to a new interface component for interacting with ti one or more other applications;
- navigating the control of processing back to the application upon a successful interaction with the one or more other applications;
- executing the test of the application using the automation bot, wherein
- the executing the test of the application corresponds to at least one of a testing of a web application and a testing of a native application,
- the testing for the web application corresponds to testing a user account creation workflow in the web application, further comprising:
  - inputting each of a set of user credentials to corresponding input field in the web application, wherein the set of user credentials comprises at least a username information, an email account information and a password information, and
  - retrieving a confirmation message for the email account from the one or more other applications opened in the new interface component, wherein the confirmation message comprises at least one of a confirmation code, an activation link and a one-time password (OTP),
- the automation bot is configured to interact with one or more other applications includes
  - accessing an email account in a new interface component, wherein the new interface component is a new web page or application;
  - determining a status of the confirmation message from the email account, wherein the status of the confirmation message is either of present or not present;
  - retrieving the confirmation message based on the determination;
  - processing the confirmation message in the application by navigating a control of processing back to the application from the new web page; and
  - determining a successful activation of the user account based on the processing of the confirmation message;
- determining one or more test results for the executed test of the application; and
- generating a notification indicative of the determined one or more test results.

8. The method of claim 7, further comprising:
determining a failure in the test execution upon unsuccessful interaction with the one or more other applications.

9. The method of claim 7, further comprising:
determining a failure in the user account creation workflow upon an unsuccessful retrieval of the confirmation message.

10. The method of claim 7, wherein the testing of the native application corresponds to testing one or more functionalities of workflows of the native application and a corresponding set of components of the native application, the set of components comprises at least one or more web components of the native application and one or more server-side components of the native application.

11. The method of claim 7, wherein generating the notification further comprises transmitting the notification to a user device via an application interface, the notification comprising at least an alert message and a test report indicative of one or more errors associated with the one or more test results.

12. A computer program stored on a non-transitory computer readable medium, the computer program are configured to cause the one or more processors to perform operations for performing a test of an application using an automation bot, the operations comprising:
- accessing the application to be tested;
- navigating a control of processing to a new interface component for interacting with one or more other applications;
- navigating the control of processing back to the application upon a successful interaction with the one or more other applications;
- executing the test of the application using the automation bot, wherein
- the executing the test of the application corresponds to at least one of a testing of a web application and a testing of a native application,
- the testing for the web application corresponds to testing a user account creation workflow in the web application, further comprising:
  - inputting each of a set of user credentials to corresponding input field in the web application, wherein the set of user credentials comprises at least a username information, an email account information and a password information, and
  - retrieving a confirmation message for the email account from the one or more other applications opened in the new interface component, wherein the confirmation message comprises at least one of a confirmation code, an activation link and a one-time password (OTP),
- the automation bot is configured to interact with one or more other applications includes
  - accessing an email account in a new interface component, wherein the new interface component is a new web page or application;
  - determining a status of a confirmation message from the email account, wherein the status of the confirmation message is either of present or not present;
  - retrieving the confirmation message based on the determination;
  - processing the confirmation message in the application by navigating a control of processing back to the application from the new web page; and
  - determining a successful activation of the user account based on the processing of the confirmation message;
- determining one or more test results for the executed test of the application; and
- generating a notification indicative of the determined one or more test results.

* * * * *